(No Model.)

S. J. MARTIN.
BATTERY.

No. 579,001. Patented Mar. 16, 1897.

WITNESSES
C. W. Bradford
Virginia M. Clough.

INVENTOR
Stephen J. Martin

UNITED STATES PATENT OFFICE.

STEPHEN J. MARTIN, OF DETROIT, MICHIGAN.

BATTERY.

SPECIFICATION forming part of Letters Patent No. 579,001, dated March 16, 1897.

Application filed May 27, 1896. Serial No. 593,355. (No model.)

*To all whom it may concern:*

Be it known that I, STEPHEN J. MARTIN, a citizen of the United States, residing at Detroit, county of Wayne, State of Michigan, have invented a certain new and useful Improvement in Secondary or Storage Batteries; and I declare the following to be a full, clear, and exact description of the invention, such as will enable others skilled in the art to which it pertains to make and use the same, reference being had to the accompanying drawings, which form a part of this specification.

My invention relates to batteries, and has for its object to provide a new and useful improvement in the construction and formation of the electrodes whereby a stronger, more durable, and efficient battery is produced.

It consists in the particular combination and arrangement of the various parts, as hereinafter described, and pointed out in the claims.

A better understanding of my device may be had by reference to the accompanying drawings, in which—

Figure 1:
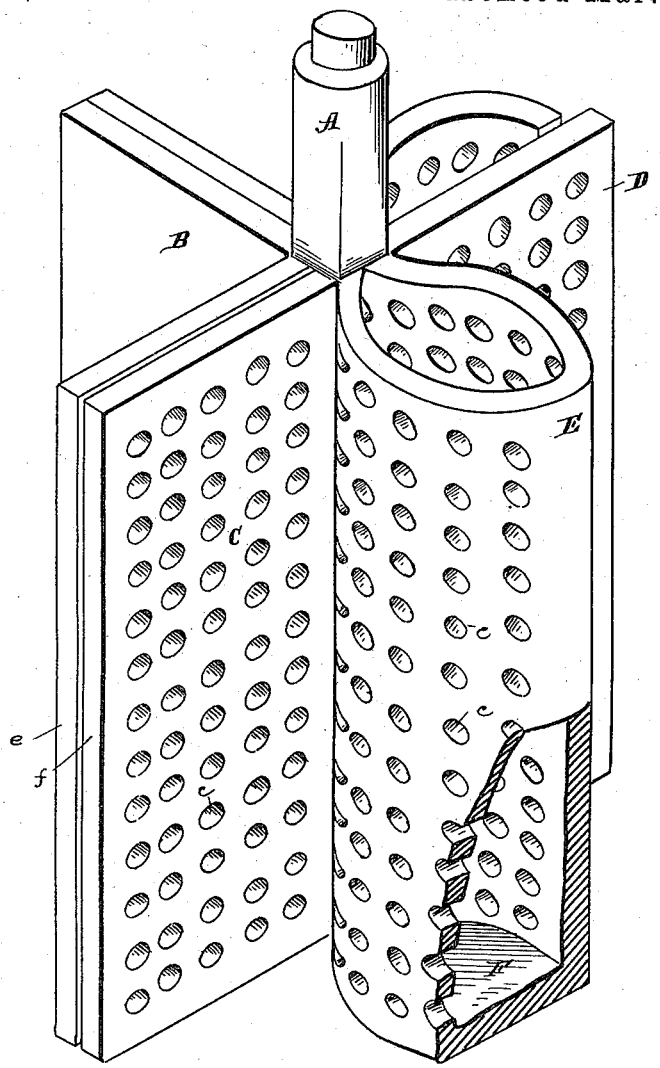
Figure 2:
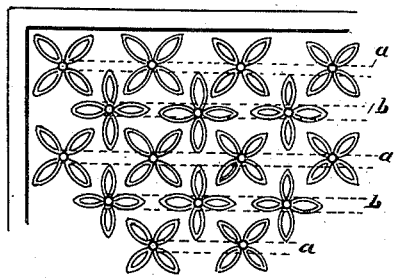

Figure 1 shows in perspective my invention, illustrating the manner of constructing and forming the electrodes. Fig. 2 is a plan view of a portion of a battery, illustrating the manner of combining and arranging the elements in the cell.

Similar letters of reference refer to corresponding parts throughout the drawings.

Referring to Fig. 1, B indicates the original form of the wings when first taken from the mold. When in this state, the device consists of the center core A, from which extend in opposite directions and at right angles to each other four pairs of wings B, C, D, and E. These wings are then perforated, as shown at c, and bent into tubular form. The tubes may be of any desired form, the one illustrated at E being preferred. The various conditions of the wings in Fig. 1 illustrate the manner of constructing my device, the plate B, as above referred to, showing the original condition, the one C illustrating the second change, and D showing the third step in its construction, while E illustrates the completed tube.

In order that the active material may be secured within these tubes, I provide an inclosing end piece at F. This may be inserted in any suitable way, preferably by welding, after the tube has been formed. The edges of the wings *e f* may also be united in a similar manner.

In Fig. 2 I have shown the arrangement of the positive and negative electrodes and the manner of connecting each series together. The bars *a b* (shown in dotted lines) are arranged to unite the upper ends A of the upward-projecting core (shown in Fig. 1) in a manner common and well known in the art and which will need no further description. The elements are so arranged in the cell that each tube of the positive series is received between two of the negative series. This arrangement provides means for reducing the internal resistance of the battery, as the active material within the tubes communicates directly with the opposing elements through the perforations *c*.

Many modifications in the general form and construction of my invention might be made without departing from its spirit, and I desire to have it understood that while I prefer the form shown I do not limit myself to that construction.

What I claim is—

1. In a secondary battery, an electrode consisting of a series of perforated tubes attached to and surrounding a central core said tubes adapted to contain the active material, substantially as described.

2. In a secondary battery, an electrode consisting of perforated tubes composed of conducting material, said tubes being formed around and integral with a central core which is prolonged into a stem for uniting the several elements, and being closed at their lower ends, and active material carried within said tubes, substantially as described.

3. In a secondary battery, an electrode consisting of four perforated tubes, secured to and formed around a central core in the form of a cruciform figure, said core arranged to project above the tubes for the purpose of uniting the several elements and a connecting-bar adapted to engage the projecting ends of said core, substantially as described.

4. In a battery, the combination of the elements A', B', each of which consists of the core A, to which are secured the oval tubes E opposed to each other, and arranged around the core to form a cruciform figure, each tube of the positive element located between two of the negative element, active material located within said tubes, and connecting-bars adapted to unite the elements of each series, substantially as described.

In testimony whereof I sign this specification in the presence of two witnesses.

STEPHEN J. MARTIN.

Witnesses:
 ROSS BROWN,
 VALENTINE NICOLAI.